United States Patent
Motgi et al.

(10) Patent No.: US 9,588,784 B2
(45) Date of Patent: Mar. 7, 2017

(54) SYSTEM AND METHOD FOR PROVIDING SELECTIVE AND VISIBLE PERSONALIZED CONTENT FOR WEBPAGES

(75) Inventors: Amit Motgi, Santa Clara, CA (US); Hrishi Mantri, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 228 days.

(21) Appl. No.: 13/597,222

(22) Filed: Aug. 28, 2012

(65) Prior Publication Data
US 2014/0068455 A1 Mar. 6, 2014

(51) Int. Cl.
| G06F 3/01 | (2006.01) |
| G06F 15/16 | (2006.01) |
| G06F 7/00 | (2006.01) |
| G06F 9/445 | (2006.01) |
| G06F 9/44 | (2006.01) |
| G06F 17/30 | (2006.01) |

(52) U.S. Cl.
CPC ........ *G06F 9/44505* (2013.01); *G06F 9/4443* (2013.01); *G06F 17/30867* (2013.01)

(58) Field of Classification Search
CPC ...... G06F 3/0481; G06F 9/4443; G06F 17/21; G06F 17/30867; G06F 17/30893
USPC .......... 715/738, 747, 513; 705/14.16, 14.53; 707/10, 999.2
See application file for complete search history.

(56) References Cited

U.S. PATENT DOCUMENTS

| 7,349,949 | B1* | 3/2008 | Connor et al. ............... 709/217 |
| 7,676,505 | B2* | 3/2010 | Chess et al. .......... 707/999.203 |
| 7,685,276 | B2* | 3/2010 | Konig et al. ................. 709/224 |
| 8,091,037 | B2* | 1/2012 | Bicker et al. ................. 715/765 |
| 8,402,011 | B1* | 3/2013 | Bodenhamer ................ 707/706 |
| 2003/0101412 | A1* | 5/2003 | Eid ............................... 715/513 |
| 2005/0138546 | A1* | 6/2005 | AbiEzzi ........................ 715/513 |
| 2006/0167768 | A1* | 7/2006 | Sculler et al. .................. 705/26 |
| 2007/0038643 | A1* | 2/2007 | Epstein ........................... 707/10 |
| 2007/0112792 | A1* | 5/2007 | Majumder ........ G06F 17/30867 |
| 2007/0168256 | A1* | 7/2007 | Horstmann .................... 705/14 |
| 2008/0172372 | A1* | 7/2008 | Shacham et al. ................ 707/5 |
| 2008/0195954 | A1* | 8/2008 | Dharmarajan et al. ....... 715/749 |
| 2009/0248505 | A1* | 10/2009 | Finkelstein et al. ........... 705/14 |
| 2010/0031162 | A1* | 2/2010 | Wiser et al. .................. 715/747 |
| 2010/0161432 | A1* | 6/2010 | Kumanov et al. ............. 705/15 |
| 2010/0180188 | A1* | 7/2010 | Bostick et al. ............... 715/207 |
| 2010/0250714 | A1* | 9/2010 | Wehmann et al. ........... 709/220 |

(Continued)

*Primary Examiner* — Li Sun
*Assistant Examiner* — Jasmine Wan
(74) *Attorney, Agent, or Firm* — Martine Penilla Group, LLP

(57) ABSTRACT

Methods and systems for providing content for webpages are disclosed. The disclosed method includes providing a plurality of selections to set webpage personalization settings and receiving a user selection chosen from one of the plurality of selections. The plurality of selections is provided for a graphic user interface to be defined on a webpage. After receiving a request for a second webpage made by a user through a user device, the content for the second webpage is selected based on the received user selection. The content selection for the second webpage includes identifying two or more content modules for presenting on the second webpage and at least one of the identified content modules includes an associated content indicator. The selected content for the second webpage is then forwarded to the user device for display.

20 Claims, 7 Drawing Sheets

(56) References Cited

U.S. PATENT DOCUMENTS

2011/0010367 A1* 1/2011 Jockish et al. ............... 707/733
2012/0272160 A1* 10/2012 Spivack et al. .............. 715/752
2012/0290909 A1* 11/2012 Speirs et al. ................. 715/205
2014/0026037 A1* 1/2014 Garb ................ G06F 17/30893
                                                        715/235

* cited by examiner

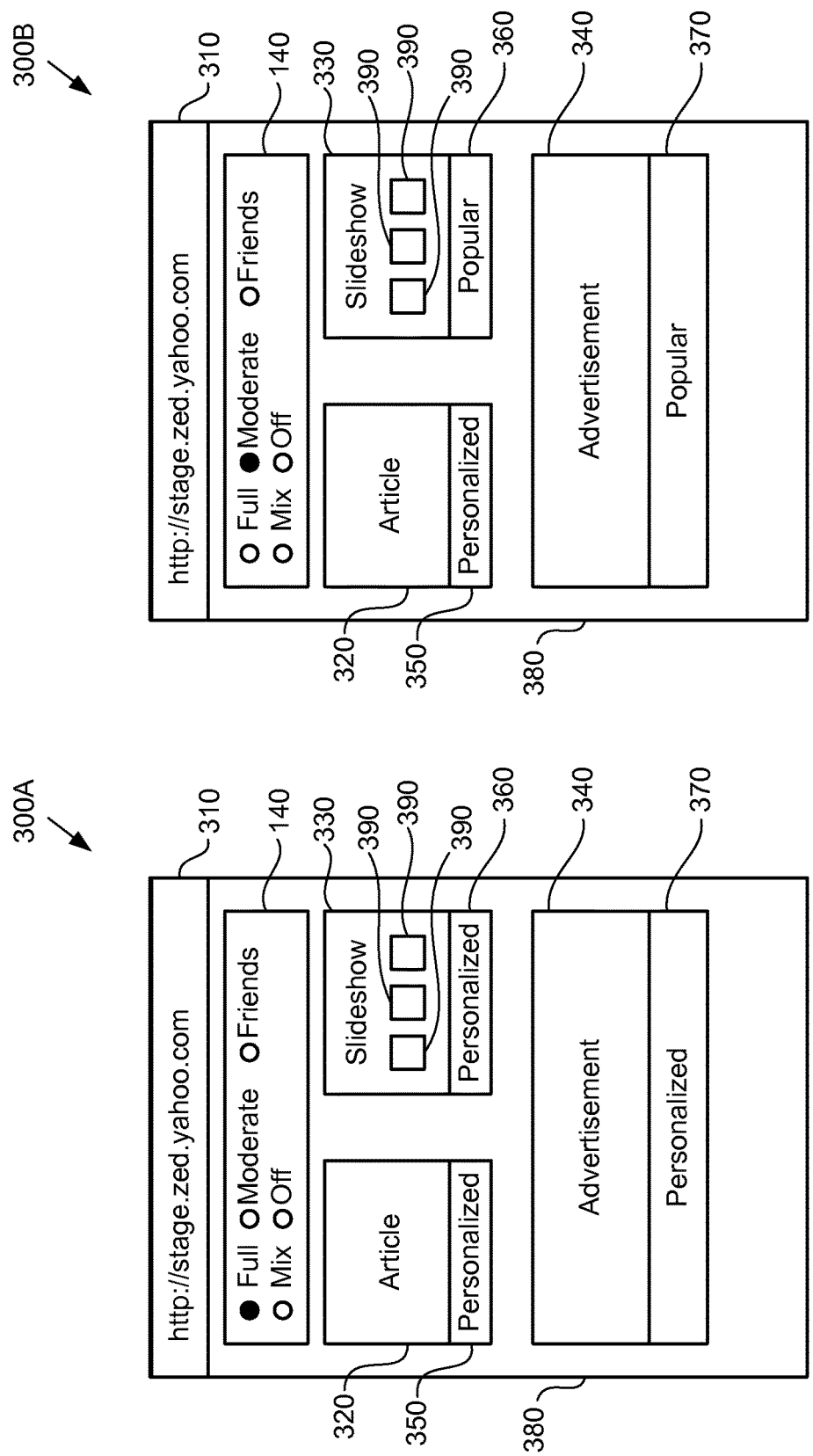

SYSTEM AND METHOD FOR PROVIDING SELECTIVE AND VISIBLE PERSONALIZED CONTENT FOR WEBPAGES

BACKGROUND

1. Field of the Invention

The invention relates generally to providing content to webpages and, more particularly, to selecting content for a requested webpage based on the received user selection.

2. Description of the Related Art

Nowadays, in order to attract more users, online service providers would like to provide more personalized content for the requested webpages. Usually, a portion of the content in a requested webpage is personalized based on the user's past online activities, and the user has no control over how the content in the requested webpage is personalization. Since the user's interest may change from time to time, some or all of the personalized content in a requested webpage may not be compelling to the user anymore. Furthermore, the user has no knowledge which portion of the content is personalized in a requested webpage.

In view of the forgoing, there is a need for a system and method for providing content for a requested webpage based on a user selection that defines the personalization settings for the webpage.

SUMMARY

Embodiments of the disclosure provide methods and system define a mechanism that is used for providing content for webpages. It should be appreciated that the present embodiments can be implemented in numerous ways, such as a process, an apparatus, a system, a device, or a method on a computer non-transitory readable medium. Several embodiments are described below.

In one embodiment, the present invention provides a method for providing content for webpages. The disclosed method includes providing a plurality of selections to set webpage personalization settings and receiving a user selection chosen from one of the plurality of selections. The plurality of selections is provided for a graphic user interface to be defined on a webpage. After receiving a request for a second webpage from a user device of a user, the content for the second webpage is selected based on the received user selection. The content selection for the second webpage includes identifying two or more content modules for presenting on the second webpage and at least one of the identified content modules includes an associated content indicator that shows the personalization setting status for the content in the associated content module. The selected content for the second webpage is then forwarded to the user device for display.

In another embodiment, a system for providing content for webpages is disclosed. The system includes a server coupled to the Internet. The server is equipped with a content processor configured to provide a plurality of selections for a graphic user interface to be defined on a webpage to set webpage personalization settings and to receive a user selection chosen from one of the plurality of selections. The content processor in the server is further configured to receive a request for a second webpage through a user device of the user and to select the content for the second webpage based on the received use selection. The content selection for the second webpage may include identifying two or more content modules for presenting on the requested webpage, and at least one of the content modules includes an associ- ated content indicator. The content processor in the server can also be configured to forward the selected content for the second webpage to the user device for display.

In yet another embodiment, the present invention provides a computer non-transitory readable media equipped with program instructions, which when executed by a computer system directs the computer system to provide content for webpages. The computer non-transitory readable media comprises program instructions for providing a plurality of selections for a graphic user interface to be defined on a webpage to set webpage personalization settings and receiving user selection chosen from one of the plurality of selections. The computer non-transitory readable media further comprises program instructions for receiving a request for a second webpage from a user device of the user and selecting the content for the requested second webpage based on the received user selection. The content selection for the requested second webpage may include identifying two or more content modules for presenting on the requested second webpage and at least one of the content modules includes an associated content indicator. The selected content for the requested second webpage is forwarded to the user device for display.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings.

FIGS. 3(A) to 3(E) illustrate webpages with various personalization settings, in accordance with one embodiment of the present invention.

DETAILED DESCRIPTION

Figure 1:
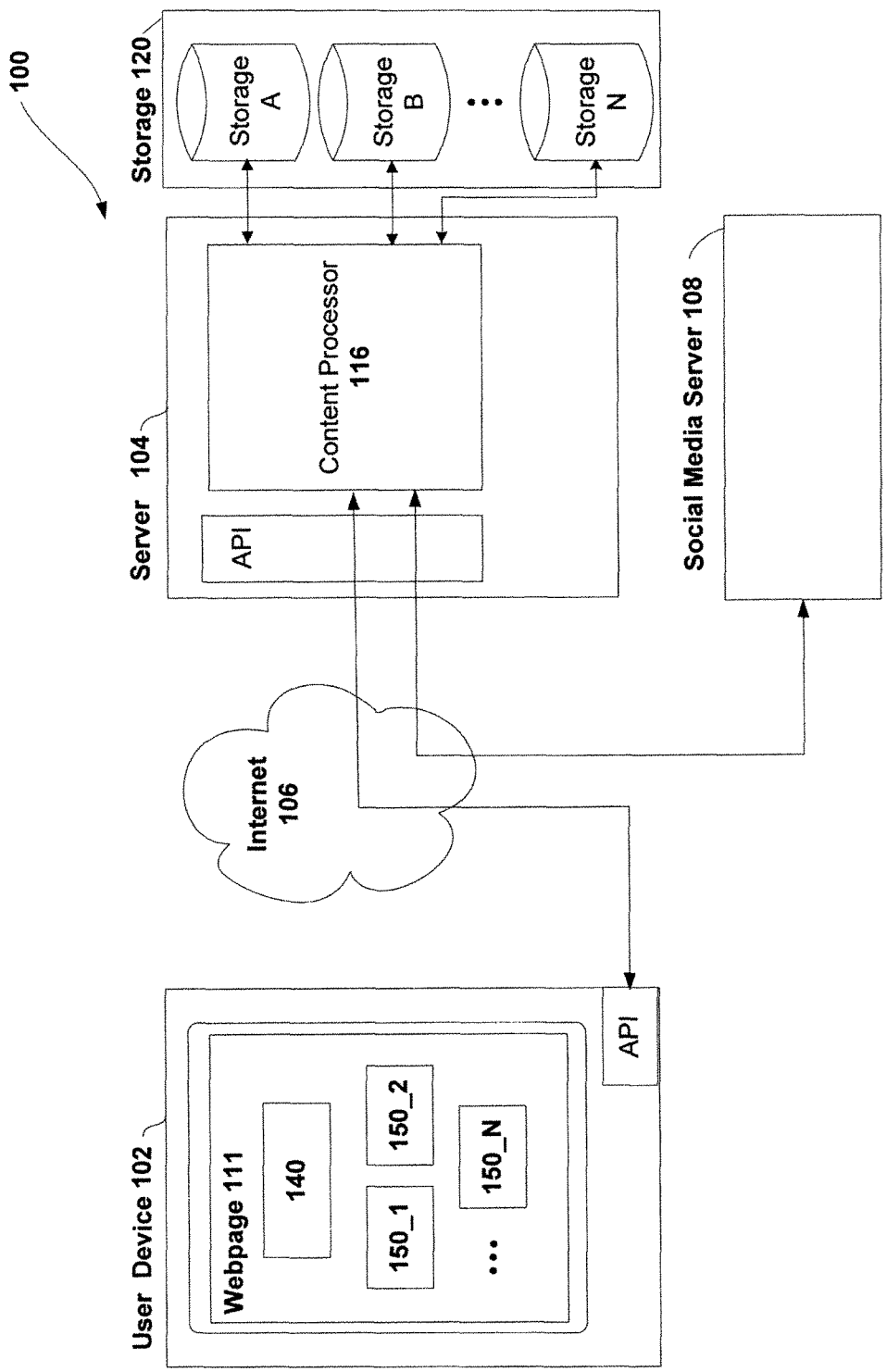
FIG. 1 illustrates a system for providing content for a webpage, in accordance with one embodiment of the present invention.

Embodiments of the present invention provide system, methods and computer non-transitory readable media for providing contents for webpages. More particularly, a method for providing content for webpages includes providing a plurality of selections, for a graphic user interface to be defined on a webpage, to set webpage personalization settings and receiving a user selection chosen from one of the plurality of selections. The method further includes receiving a request for a second webpage made by a user through a user device and selecting the content for the second webpage based on the received user selection. The content selection for the second webpage includes identifying two or more content modules to be presented on the second webpage. At least one of the identified content modules includes an associated content indicator. The content indicator may show the personalization setting status for the content in the associated content module. The selected content for the requested second webpage is then forwarded to the user device for display. The disclosed method may be executed by a content processor in a server managed by an online service provider. The server is coupled to the Internet.

A user may select from one of the plurality of selections provided and send the user selection to the content processor of the server via the Internet. Based on the user selection, all or a portion of the identified content modules for the requested second webpage are personalized. The selected content may be personalized based on the online activities of the user's social network friends so as to attract more users from the social network to visit the web services provided by the server. In this way, the user can have control over the personalization settings for the requested second webpage and know which content module in the requested second webpage is personalized based on the indication of the content indicator associated with the content module.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 illustrates a system 100 for providing content for a webpage 111, in accordance with one embodiment of the present invention. The system 100 includes a user device 102, a processing server (or simply a "server") 104, and a social media server 108, all of which are connected to Internet 106. Server 104, in one embodiment, may be part of an online service provider, which is a system that includes a plurality of servers for providing contents, services, and applications for various businesses, social, and technology related subject matters. One example of the online service provider is Yahoo! Inc. of Sunnyvale, Calif. Other digital service providers can be more focused to provide only specific services, while others provide a variety of services for access, download, viewing, searching, etc. The content can vary greatly, but is commonly presented in digital format and displayed on monitors or screens of devices, computers, smartphones, tablets, etc.

In one embodiment, server 104 is equipped with a content processor 116 that interacts with user device 102 through a server-side application programming interface (API) and a corresponding user-side API. In one embodiment, server 104 is coupled to a storage 120 that includes a plurality of storage systems, such as storage A, storage B . . . storage N. The various storage systems in storage 120 can provide online content for various webpages requested by Internet users. The content stored in storage 120 can vary greatly, but is commonly presented in digital format and can be displayed on monitors or screens of devices, computer, smartphones, tablets, etc. In one embodiment, content processor 116 of server 104 may provide a plurality of selections that define webpage personalization settings, and the plurality of selection may be forwarded to a user device, e.g., user device 102. The plurality of selections may be shown to a user in the form of a selection module 140 in a webpage, e.g., webpage 111. In one embodiment, webpage 111 may be a webpage requested by a user. In another embodiment, webpage 111 maybe a set up page associated with a user's profile maintained by server 104. In one embodiment, webpage 111 includes selection module 140 and a plurality of content modules 150_1 to 150_N. In one embodiment, each content module in webpage 111 may include content related to the same category. For example, content module 150_1 may include content related to current news, content module 150_2 may include content related to sports, and content module 150_N may contain advertisement.

In one embodiment, the plurality of selections that define the webpage personalization settings is Full, Moderate, Friends, Mix, and Off. The plurality of selections may be presented in selection module 140 in the form of radio buttons. A "Full" personalization setting means all of the content in the content modules displayed in webpage 111 is personalized. A "Moderate" personalization setting means the content in a portion of the content modules displayed in webpage 111 is personalized and the content in the remaining portion of the content modules displayed in webpage 111 is editorially curated. A "Friends" personalization setting means all of the content in the content modules displayed in webpage 111 is personalized based on the online activities of the user's social network friends. A "Mix" personalization setting means the content in a portion of content modules displayed in webpage 111 is personalized and at least a portion of the personalized content is based on the online activities of the user's social network friends. An "Off" personalization setting means all of the content in the content modules displayed in webpage 111 are editorially curated.

In one embodiment, a user may choose from one of the plurality of selections presented in selection module 140 by clicking the radio button associated with the chosen selection. It is to be understood that the plurality of selections provided by content processor 116 may be presented to a user in other selection means, for example, check boxes, pull down menus, etc. The user selection may be received by content processor 116 of server 104.

In one embodiment, a user can access storage 120 by way of user device 102. User device 102 may be any type of device having a processor and memory, wired or wireless, portable or not portable. User device 102 may be a mobile user device, such as a cellular phone, smart phone, or the like, a laptop device, a desktop device, a personal computer, or any other computing device that is capable of being coupled to Internet 106 and communicate with server 104. Although FIG. 1 illustrates one user device to be used by a user to access the service provided by server 104, it is to be understood that in practice, many more users may access the service, including online contents, provided by server 104, and the service can be widely distributed across networks.

In one embodiment, content processor 116 of server 104 may access social media server 108 to monitor the online activities of the user's friends in a social network. Social media server 108 may maintain a plurality of user profiles for a social network for the user who is using user device 102 and his or her social network friends.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like.

A social network may include individuals with similar experiences, opinions, education levels or backgrounds. Subgroups may exist or be created according to user profiles of individuals, for example, in which a subgroup member may belong to multiple subgroups. An individual may also have multiple "1:few" associations within a social network, such as for family, college classmates, or co-workers.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so-called 'virtual persons.' An individual's social network may be represented in a variety of forms, such as visually, electronically or functionally. For example, a "social graph" or "socio-gram" may represent an entity in a social network as a node and a relationship as an edge or a link.

In one embodiment, content processor 116 of server 104 may monitor the online activities of the user' social network friends in social media server 108. The online activities of the user's social network friends may include social interaction and sharing made by the user's social network friends. For example, the user's social network friends may share their likes, dislikes, or comments with the user. The social information can be shared in the social network streams or circles, during live chats, or video chats. In one embodiment, this sharing can include sharing of recommendations regarding the online contents, e.g., articles, songs, videos, etc., provided by the user's social network friends. The social network friends' recommendation may be obtained by content processor 116 in server 104. In one embodiment, if the user selects to have the content in webpage 111 to be personalized according to his or her social network friends' online activities, content processor 116 may select content from storage 120 based on the monitored online activities of the user's social network friends and forward the selected content to the user device.

Figure 2:
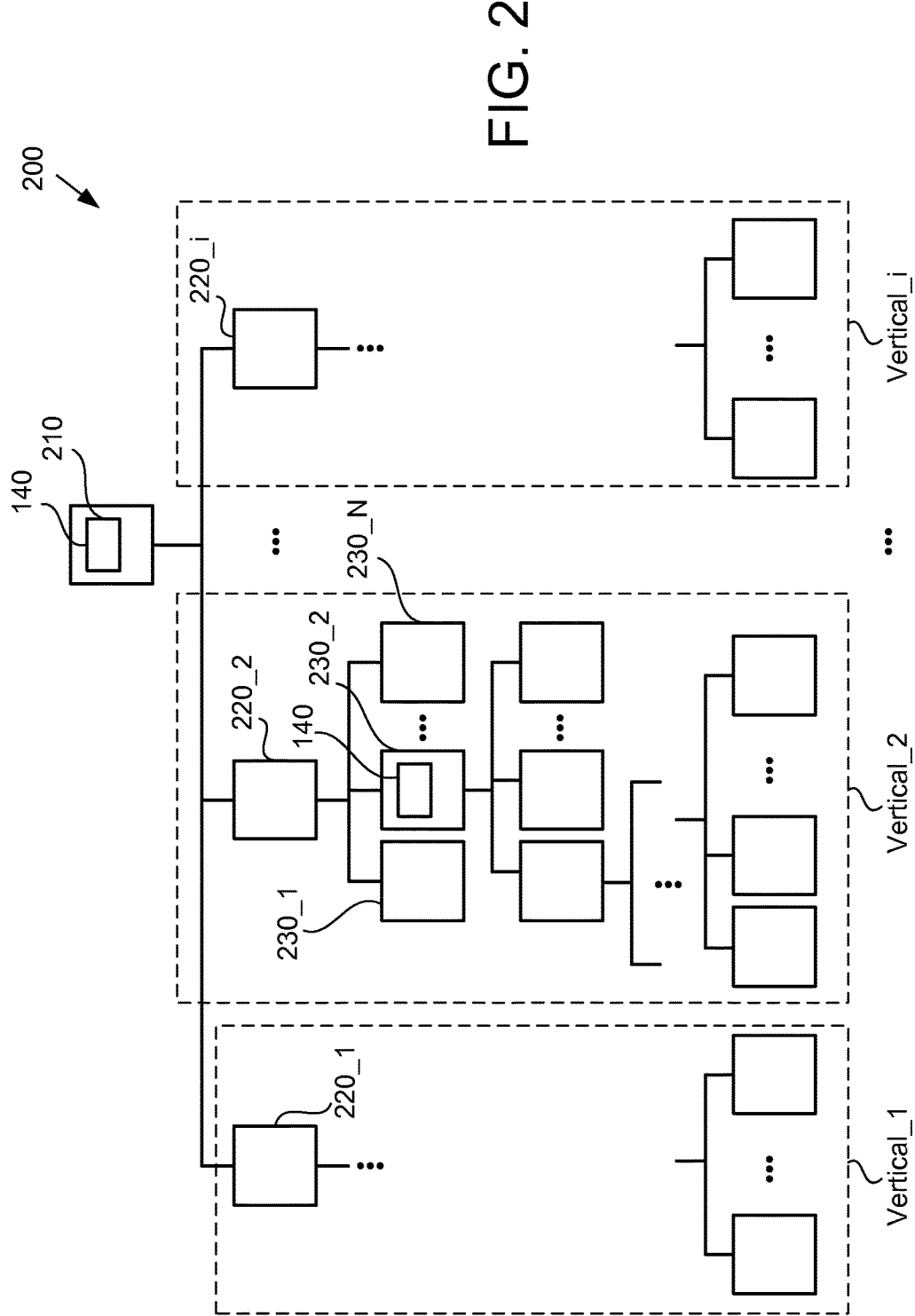
FIG. 2 illustrates a webpage structure with embedded selection modules, in accordance with one embodiment of the present invention.

FIG. 2 illustrates a webpage structure 200 with embedded selection modules 140, in accordance with one embodiment of the present invention. As shown, the webpage structure 200 starts with the homepage 210. A plurality of second layer webpages 220_1, 220_2, . . . 220_i is defined under the homepage 210. One or more sub-layer webpages may be derived from one or more of the second layer webpages. As discussed above, a webpage, such as webpage 111, may include content modules that present content having specific context. Context can be defined based on types of media, or categories with a type of media. Each content modules, as noted above, will define a type of content, such as movie related content, music related content, picture related content, game related content, video related content, gossip related content, etc.

In one embodiment, a "vertical" defines a type of media, such as music, movies, communication, shopping, gaming, etc. Within each vertical, further contextual categories can be defined. For instance, within music, a context can be defined for types of music, each artist, etc. For example, the second layer webpage 220_2 and all of the sub-layer webpages defined under the webpage 220_2 can be defined as a vertical ("vertical_2").

In one embodiment, selection module 140 that provides selections for defining webpage personalization settings for a user may be provided for the homepage 210. For example, if the user chooses to have the "Full" personalization setting at the selection module 140 at the homepage 210, the user selection at the homepage 210 will affect the selection of content for all of the webpages defined under the homepage 210 and the homepage 210. As a result, all content in all of the webpages defined under the homepage 210 and the homepage 210 are personalized.

In one embodiment, selection module 140 that provides selections for defining webpage personalization settings can be provided in a sub-layer webpage, for example, webpage 230_2. The user selection entered in selection module 140 at webpage 230_2 will affect content selection for the webpages defined under the webpage 230_2 in the same vertical and the webpage 230_2. Although the section module 140 that provides selections for defining webpage personalization settings are shown at the homepage 210 and the sub-webpage 230_2, it is to be understood that the selection module 140 may appear in every webpage, e.g., a webpage 230_1, a webpage 230_N, etc., or any selected webpages.

FIGS. 3(A) to 3(E) illustrate webpages with various personalization settings, in accordance with one embodiment of the present invention. Each of the webpages shown in FIGS. 3(A) and 3(B) includes a web address window 310 and a content display window 380. Content display window 380 includes a selection module 140 and three content modules 320, 330, and 340. As shown, each of the content modules 320, 330, and 340 includes a content indicator. For example, content module 320 includes a content indicator 350, content module 330 includes a content indicator 360, and content module 340 includes a content indicator 370. It is to be understood that in practice, more or less content modules may be shown in content display window 380, and selection module 140 may or may not be shown in content display window 380. Although in the embodiments shown in FIG. 3(A) to FIG. 3(E), each of the content modules include a respective content indicator, in practice, one or more content modules in a webpage may not include the content indicators. However, at least one content module in a webpage includes a content indicator. The content indicator may indicate the personalization setting status for the content in the associated content module by phrases, names of persons, colors, graphics, etc.

FIG. 3(A) shows a webpage 300A that is fully personalized. Content module 320 shows content of an article, content module 330 shows a plurality of slides 390, and content module 340 shows an advertisement. Because the personalization setting of "Full" is chosen in selection module 140, all content in each of the content modules 320, 330, and 340 are personalized. Thus, each of the content indicators 350, 360, and 370 shows "Personalized" to indicate the content in each of content modules 320, 330, and 340 is personalized. In one embodiment, the personalized content is chosen by content processor 116 of server 104 from storage 120 based on the user's past online activities.

FIG. 3(B) shows a webpage 300B that is partially personalized. For the webpage 300B, the personalization setting of "Moderate" is chosen in selection module 140. Content module 320 shows content of an article, content module 330 shows a plurality of slides 390, and content module 340 shows an advertisement. As such, the content in content module 320 is personalized and the content in content modules 330 and 340 are editorially curated. In one embodiment, the editorially curated content is chosen based on the current trends or popularity in the content category. Thus, content indicators 350 shows "Personalized" to indicate that the content in content module 320 is personalized, and each of the content indicators 360 and 370 shows "Popular" to indicate that the slide show in content module 330 and the advertisement in content module 340 are chosen based on popular slide shows and popular advertisement.

Figures 3C, 3D:
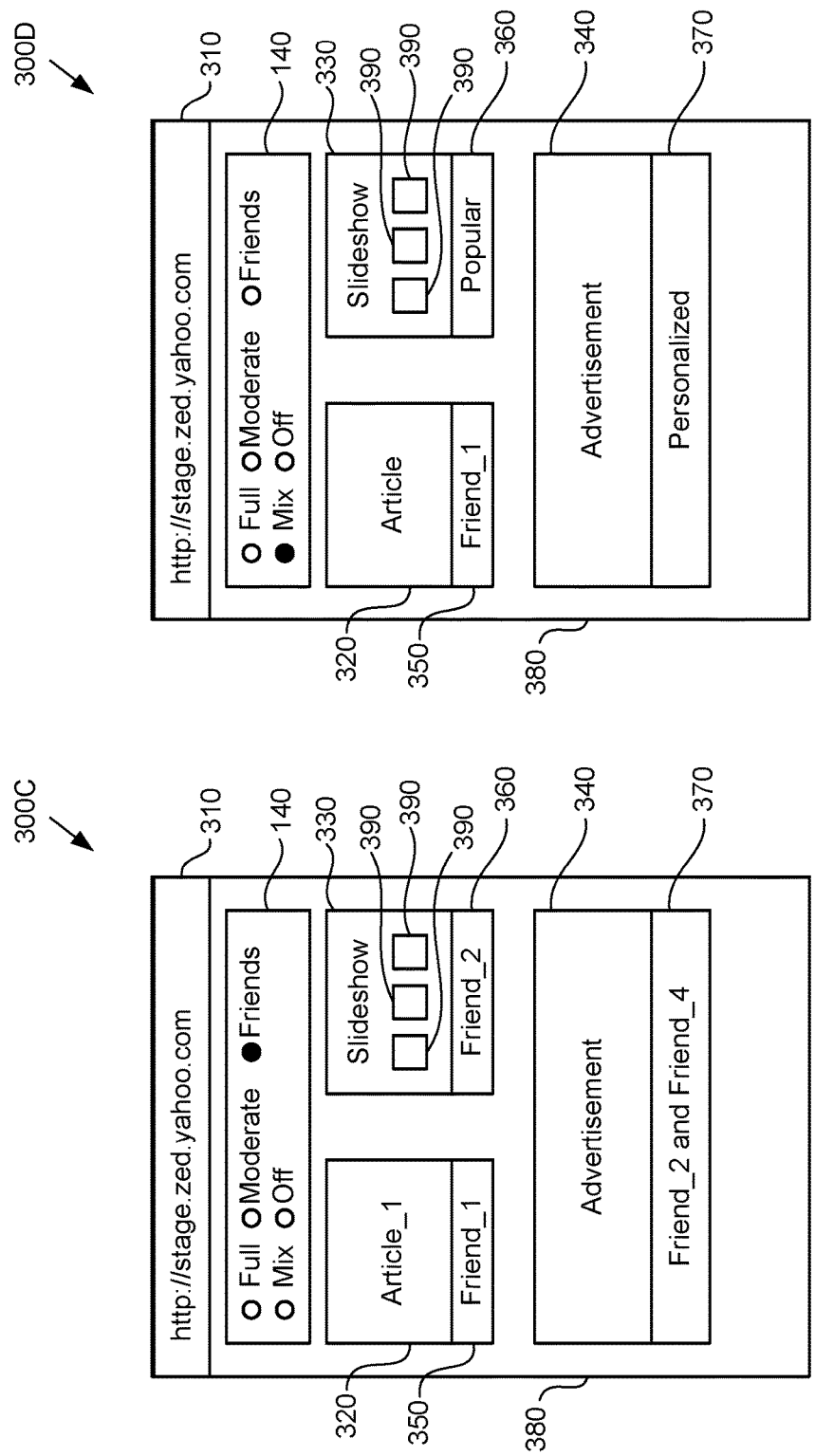

FIG. 3(C) shows a webpage 300C that is personalized based on the online activities of the user's social network friends. For the webpage 300C, the personalization setting of "Friends" is chosen in selection module 140. Content module 320 shows content of article_1, content module 330 shows a plurality of slides 390, and content module 340 shows article_2. In one embodiment, the online activities of the user's social network friends may be recommendations made by the user's social network friends. For example, a user's social network friend may make a direct recommendation to the user, or, alternatively, the user's social network friends may make a general recommendation to all of his or her friends listed in the social network.

As shown, content indicator 350 for content module 320 shows "Friend_1" to indicate that Article_1 shown in content module 320 is recommended by Friend_1 of the user. Content indicator 360 for content module 330 shows "Friend_2" to indicate that the slide show shown in content module 330 is recommended by Friend_2 of the user. Content indicator 370 for content module 340 shows "Friend_2 and Friend_4" to indicate that Article_2 shown in content module 340 is recommended by Friend_2 and Friend_4 of the user. In one embodiment, Friend_1, Friend_2, and Friend_4 are the user's social network friends, whose user profiles along with the user's profile are maintained by social media server 108. The recommendations of the user's social network friends may be monitored and obtained by content processor 116 of server 104, as shown in FIG. 1.

FIG. 3(D) shows a webpage 300D that is partially personalized with at least one content module that shows the content personalized based on the online activities of the user's social network friends and the remaining content modules for the requested webpage may include content that is either personalized or editorially curated. For the webpage 300D, the personalization setting of "Mix" is chosen in selection module 140. Content module 320 shows content of an article, content module 330 shows a plurality of slides 390, and content module 340 shows an advertisement. The article shown in content module 320 is personalized based on the recommendation of the user's social network friend "Friend_1." The slides 390 in content modules 330 are editorially curated based on the popularity of the slideshow. The advertisement in content module 340 is personalized. In one embodiment, the personalized advertisement shown in content module 340 is chosen based on the user's online activities. The user's online activities include the search terms the user typed in a search website, the user's past online purchase, the user's shopping searches in one or more shopping websites, etc. Thus, content indicators 350 shows "Friend_1" to indicate that the article in content module 320 is recommended by the user's social network friend "Friend_1," content indicator 360 shows "Popular" to indicate that the slideshow in content module 330 is chosen based on popularity of the slides 390, and content indicator 370 shows "Personalized" to indicate that the advertisement shown in content module 340 is personalized, e.g., based on user's past online activities.

Figure 3E:
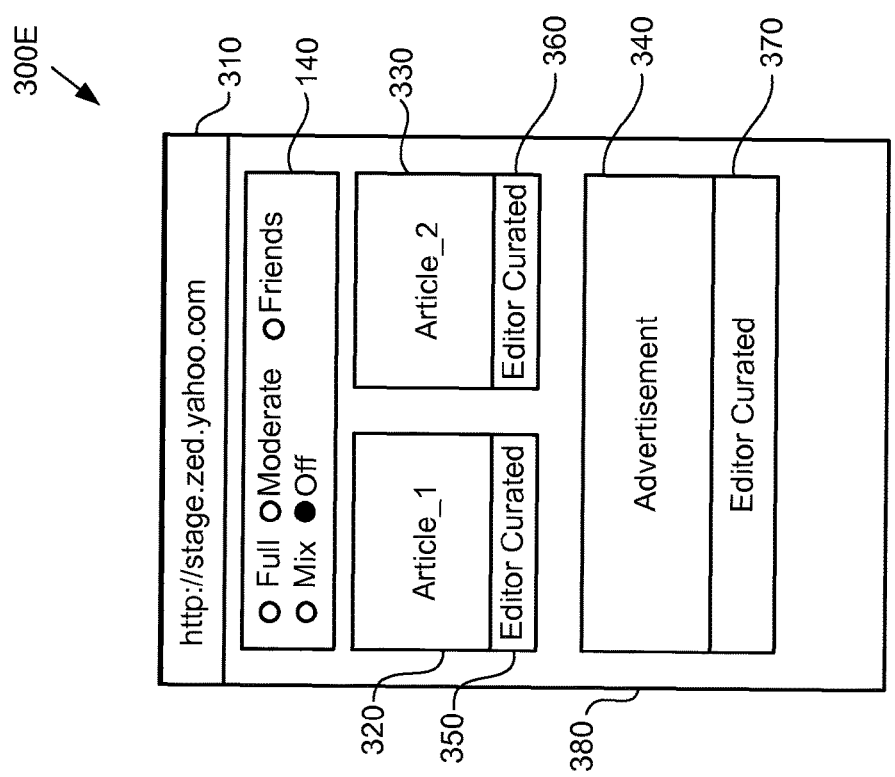

FIG. 3(E) shows a webpage 300E that is not personalized. For the webpage 300E, the personalization setting of "Off" is chosen in selection module 140. Content module 320 shows content of Article_1, content module 330 shows content of Article_2, and content module 340 shows an advertisement. As such, all content in each of the content modules 320, 330, and 340 are editorially curated. Thus, each of the content indicators 350, 360, and 370 shows "Editor Curated" to indicate the content in each of content modules 320, 330, and 340 is editorially curated. In one embodiment, the editorially curated content is chosen by content processor 116 of server 104 from storage 120 based on the pre-defined content selection rules.

Figure 4:
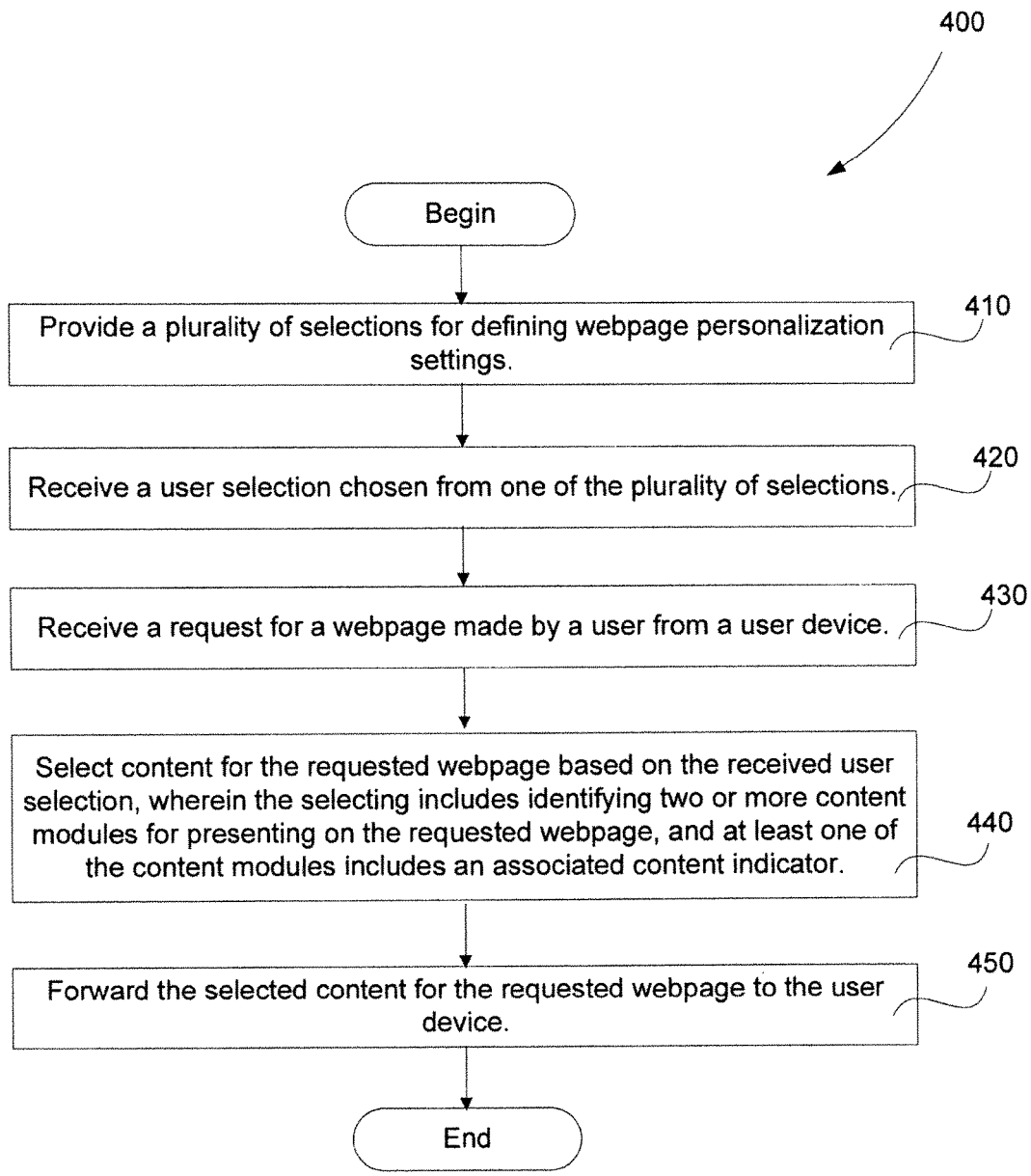
FIG. 4 illustrates a flow diagram of an exemplary method for providing content for webpages, in accordance with one embodiment of the present disclosure.

FIG. 4 illustrates a flow diagram of an exemplary method 400 for providing content for webpages, in accordance with one embodiment of the present disclosure. In one embodiment, the illustrated exemplary method 400 is described in relation to operations performed by content processor 116 of server 104, as shown in FIG. 1.

The method 400 begins at operation 410 where a plurality of personalization setting selections (or simply "selections") is provided for a graphic user interface to be defined on a webpage. The plurality of selections is used to set webpage personalization settings. In one embodiment, the plurality of selections is one or more of Full, Moderate, Friends, Mix, or Off. A "Full" selection means all content in the content modules displayed in the webpage is personalized. A "Moderate" selection means the content in a portion of the content modules is personalized and the content in the remaining content modules is editorially ranked. A "Friends" selection means that all of the content in the content modules displayed in the webpage is personalized based on the online activities of the user's social network friends. A "Mix" selection means that a mix of personalized and editorially ranked contents will be shown in the webpage and at least one content module includes content that is personalized based on the user's social network friends' online activities. An "Off" selection means all content in the webpage will be editorially curated or ranked.

In one embodiment, the plurality of selections is provided by content processor 116 of server 104 to the user who is accessing the web services via user device 102. The plurality of selections may be shown in the form of radio button selections in selection module 140 that is displayed in webpage 111. As shown in FIG. 2, one or more selection modules 140 may be provided in the homepage of a website, or any webpage in the website.

In operation 420, a user selection chosen from one of the plurality of selections is received. As discussed above, the plurality of selections along with the associated radio buttons may be displayed in the display screen of user device 102. In one embodiment, the use selection is chosen by the user by clicking the corresponding radio button associated with the chosen selection. The user selection may be sent by user device 102, via Internet 106, to content processor 116 of server 104.

In one embodiment, the plurality of selections may be provided, by content processor 116 of server 104, in the set up page of a user profile registered with a web service provided by the online service provider that manages server 104. In another embodiment, the plurality of selections may be provided, by content processor 116 of server 104, in any web page managed by the online service provider. As discussed above, the user selection chosen from one of the plurality of the selections in a webpage may define the personalization settings for the webpage and all other webpages that are derived from the web page in the same vertical.

In operation 430, a request for a webpage, made by a user from a user device, is received. The request for the webpage may be made by the user via user device 102, and the request for the webpage may be sent from user device 102 to content processor 116 of server 104.

In operation 440, content for the requested webpage is selected based on the received user selection that defines the personalization settings for the requested webpage. The selection of the content for the requested webpage includes identifying two or more content modules to be presented on the requested webpage, and at least one of the content modules includes an associated content indicator. In one embodiment, the content modules are identified by content processor 116 of server 104. In one embodiment, the content modules are identified by content processor 116 from one or more storage systems in storage 120.

In one embodiment, the content indicator will show the personalization setting status for the associated content module. For example, if the user selection for the requested webpage is "Full," all of the content in the identified content modules for the requested webpage is personalized. Thus, the content indicators associated with the identified content modules in the requested webpage may show "Personalized." In another example, if the user selection for the requested webpage is "Moderate," the content in at least one identified content modules may be personalized and the content in the remaining identified content modules may be editorially curated. As such, the content indicator associated with the identified content module having personalized content for the requested webpage may show "Personalized," the content indicator associated with the identified content module having content that is editorially curated for the requested webpage may show "Editor Curated" or "Popular" if the content is chosen based on the popularity of the selected content category. In yet another example, if the user selection for the requested webpage is "Friends," all of the content in the identified content modules for the requested webpage is personalized based on the online activities of the user's social network friends. In one embodiment, the online activities of the user's social network friends may be the recommendations made by the user's social network friends in a social network maintained by social media server 108. Thus, the content indicators associated with the identified content modules in the requested webpage may show the name of the friend or friends whose online activities are used to identify the content for the content modules. In still yet another example, if the user selection for the requested webpage is "Mix," at least one identified content module contains content that is personalized for the user based on the online activities of the user's social network friends and the content in the remaining identified content modules may contain content that is editorially curated or personalized. Thus, the content indicators associated with the personalized identified content module in the requested webpage may show "Personalized" or "Friends" if the content is personalized based on the online activities of the user's social network friend or friends, the content indictor associated with the editorially curated content module may show "Editor Curated" or "Popular" if the content is selected based on the popularity of the selected content category. In still yet further example, if the user selection for the requested webpage is "Off," all of the content in the identified content modules for the requested webpage is editorially curated. Thus, the content indicators associated with the identified content modules in the requested webpage may show "Editor Curated" or "Popular" if the content is selected based on the popularity of the selected content category.

In operation 450, the selected content for the requested webpage is forwarded to the user device, for example, user device 102. In one embodiment, the selected content is forwarded to the user device 102 by content processor 116 of server 104 via Internet 106. In one embodiment, the selected content for the requested webpage, for example, webpage 111, may be displayed in the display screen of user device 102.

Figure 5:
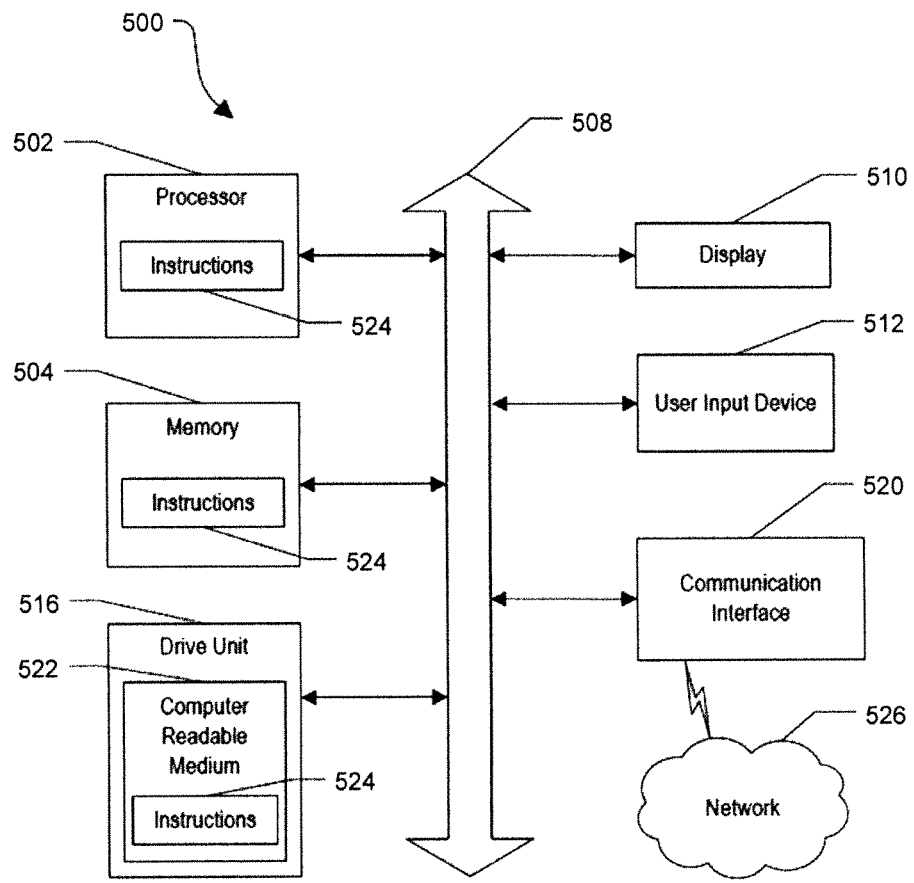
FIG. 5 illustrates an embodiment of a general computer system.

FIG. 5 illustrates an embodiment of a general computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 504 includes a cache or random access memory for the processor 502. In alternative embodiments, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 500 may further include a display unit 510, such as a liquid crystal display (LCD), an organic light emitting diode (OLED), a flat panel display, a solid state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 516.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control or any other device operative to interact with the computer system 500.

The computer system 500 may also or alternatively include a disk or optical drive unit 516. The disk drive unit 516 may include a computer-readable medium 522 in which one or more sets of instructions 524, e.g. software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 526 can communicate voice, video, audio, images or any other data over the network 526. Further, the instructions 524 may be transmitted or received over the network 526 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 526, external media, the display 510, or any other components in system 500, or combinations thereof. The connection with the network 526 may be a physical connection, such as a wired Ethernet connection or may be established wirelessly as discussed below. Likewise, the additional connections with other components of the system 500 may be physical connections or may be established wirelessly. The network 526 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 526. The network 526 may be the same as, similar to, and/or in communication with another network that includes Internet 106, as shown in FIG. 1. Any of networks may be wired or wireless. The wireless network may be a cellular telephone network, an 802.11, 802.16, 802.20, or WiMax network. Further, any of the networks may be a public network, such as the Internet, a private network, such as an intranet, or combinations thereof, and may utilize a variety of networking protocols now available or later developed including, but not limited to TCP/IP based networking protocols. The networks may include wide area networks (WAN), such as the Internet, local area networks (LAN), campus area networks, metropolitan area networks, a direct connection such as through a Universal Serial Bus (USB) port, or any other networks that may allow for data communication. The networks may be configured to couple one computing device to another computing device to enable communication of data between the devices. The networks may generally be enabled to employ any form of machine-readable media for communicating information from one device to another. The networks may include communication methods by which information may travel between computing devices. The networks may be divided into sub-networks. The sub-networks may allow access to all of the other components connected to Internet 106 in the system 100, or the sub-networks may restrict access between the components connected to the networks. The networks may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

Note that the concepts of "client" and "server," as used in this application and the industry are very loosely defined and, in fact, are not fixed with respect to machines or software processes executing on the machines. Typically, a server is a machine or process that is providing information to another machine or process, i.e., the "client," that requests the information. In this respect, a computer or process can be acting as a client at one point in time (because it is requesting information). Some computers are consistently referred to as "servers" because they usually act as a repository for a large amount of information that is often requested. For example, a World Wide Web (WWW, or simply, "Web") site is often hosted by a server computer with a large storage capacity, high-speed processor and Internet link having the ability to handle many high-bandwidth communication lines.

A server machine will most likely not be manually operated by a human user on a continual basis, but, instead, has software for constantly, and automatically, responding to information requests. On the other hand, some machines, such as desktop computers, are typically thought of as client machines because they are primarily used to obtain information from the Internet for a user operating the machine. Depending on the specific software executing at any point in time on these machines, the machine may actually be performing the role of a client or server, as the need may be. For example, a user's desktop computer can provide information to another desktop computer. Or a server may directly communicate with another server computer. Sometimes this is characterized as "peer-to-peer," communication. Although processes of the present invention, and the hardware executing the processes, may be characterized by language common to a discussion of the Internet (e.g., "client," "server," "peer") it should be apparent that software of the present invention can execute on any type of suitable hardware including networks other than the Internet.

Although software of the present invention may be presented as a single entity, such software is readily able to be executed on multiple machines. That is, there may be multiple instances of a given software program, a single program may be executing on different physical machines, etc. Further, two different programs, such as a client a server program, can be executing in a single machine, or in different machines. A single program can be operating as a client for information transaction and as a server for a different information transaction.

A "computer" for purposes of embodiments of the present invention may include any processor-containing device, such as a mainframe computer, personal computer, laptop, notebook, microcomputer, server, personal data manager or personal information manager (also referred to as a "PIM") smart cellular or other phone, so-called smart card, set-top box, or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer non-transitory readable medium" or "computer non-transitory readable media" for purposes of embodiments of the present invention may be any medium/media that can contain, store, communicate, propagate, or transport the computer program for use by or in connection with the instruction execution system, apparatus, system or device. The computer non-transitory readable medium can be, by way of example only but not by limitation, an electronic, magnetic, optical, electromagnetic, infrared, or semiconductor system, apparatus, system, device, propagation medium, carrier wave, or computer memory. The computer non-transitory readable medium may have suitable instructions for synchronously presenting multiple video program ID streams, such as on a display screen, or for providing for input or presenting in accordance with various embodiments of the present invention.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method comprising:
providing, by an online media server, a plurality of selections on a webpage for display on a client device to set webpage personalization settings within the web page on the client device, wherein the plurality of selections includes a Friends selection related to a social network of a user, an Off selection that is not related to the social network and not related to the user and is related to popularity of content, and a Full selection that is related to personalized content for the user, wherein the social network is maintained by a social media server;
receiving an input, by the online media server, for the Friends selection within the web page from the user, wherein the input for the Friends selection is received while the web page is being displayed on the client device via the Internet;
in response to receiving the input for the Friends selection from the plurality of selections, selecting, by the online media server, one or more content modules for displaying on the webpage, wherein the one or more content modules are configured to include advertisement content that is selected based on online activities of the user's friends in the social network;
in response to said selecting of the one or more content modules, forwarding, by the online media server, the one or more content modules and the advertisement content to the client device for display on the webpage from which the Friends selection is made by the user, wherein the advertisement content is displayed within the one or more content modules,
wherein each of the content modules displayed includes a content indicator that indicates one of the webpage personalization settings;
receiving another input for the Off selection within the webpage displayed on the client device when the Off selection is selected by the user; and
in response to receiving the input for the Off selection, switching, by the online media server, the advertisement content that is displayed to another advertisement content that is selected based on the Off selection and switching the content indicator to another content indicator for display within the webpage.

2. The method of claim 1, wherein the other advertisement content for the Off selection is not based on a browsing history of the user and not based on the online activities of the user's friends.

3. The method of claim 1, wherein the plurality of selections includes a Moderate selection and a Mix selection, wherein said selecting the one or more content modules for the Friends selection for displaying on the webpage includes selecting the advertisement content for the Friends selection for displaying on one or more webpages defined under the webpage.

4. The method of claim 1, wherein in response to receiving an input for the Full selection, all content in the one or more content modules for the webpage is personalized.

5. The method of claim 3, wherein in response to receiving an input for the Moderate selection, content in one of the one or more content modules for the webpage is personalized and content in another one of the one or more content modules for the webpage is editorially curated.

6. The method of claim 1, wherein in response to receiving the input for the Friends selection, all content in the one or more content modules for the webpage is based on the online activities of the user's friends in the social network.

7. The method of claim 3, wherein in response to receiving an input for the Mix selection, content in one of the one or more content modules is based on the online activities of the user's friends in the social network, content in another one of the one or more content modules is personalized to the user, and content in yet another one of the one or more content modules is editorially curated.

8. The method of claim 1, wherein in response to receiving the input for the Off selection, all content in the one or more content modules for the webpage is editorially curated.

9. The method of claim 1, wherein each of the one or more content modules for the webpage includes content related to a same category.

10. The method of claim 1, further comprising:
monitoring, by the online media server, the online activities of the user's friends in the social network, wherein the online activities include a share from one of the user's friends to another one of the user's friends via the social network.

11. A system comprising:
an online media server coupled to Internet, the online media server equipped with a content processor configured to:
provide a plurality of selections on a webpage for display on a client device to set webpage personalization settings within the web page on the client device, wherein the plurality of selections includes a Friends selection related to a social network of a user, an Off selection that is not related to the social network and not related to the user and is related to popularity of content, wherein the social network is maintained by a social media server,
receive an input for the Friends selection within the web page from the user, wherein the input for the Friends selection is received while the web page is being displayed on the client device via the Internet,
in response to receiving the input for the Friends selection from the plurality of selections, select one or more content modules for displaying on the webpage, wherein the one or more content modules are configured to include advertisement content that is selected based on online activities of the user's friends in the social network;
in response to said selecting of the one or more content modules, forward the one or more content modules and the advertisement content for the webpage to the client device for display on the webpage from which the Friends selection is made by the user, wherein the advertisement content is displayed within the one or more content modules,
wherein each of the content modules displayed includes a content indicator that indicates one of the webpage personalization settings;
receive another input for the Off selection within the webpage displayed on the client device when the Off selection is selected by the user; and
in response to receiving the input for the Off selection, switch the advertisement content that is displayed to another advertisement content that is selected based on the Off selection and switch the content indicator to another content indicator for display within the webpage.

12. The system of claim 11, wherein the other advertisement content for the Off selection is not based on a browsing history of the user and not based on the online activities of the user's friends.

13. The system of claim 12, wherein the client device is coupled to the Internet and is configured to:
send a request for the webpage to the content processor of the online media server,
send the input for the Friends selection to the content processor of the online media server,
receive the advertisement content for the Friends selection from the content processor of the online media server, and
display the webpage on a display screen of the client device.

14. The system of claim 11, wherein the webpage is managed by the online media server, wherein the online media server is configured to select the advertisement content for one or more webpages defined under the webpage.

15. The system of claim 11, wherein the webpage is a set up page of a user profile associated with the user.

16. The system of claim 11, wherein the social media server is coupled to the Internet, wherein the social media server maintains a plurality of profiles for the user and the user's friends in the social network.

17. The system of claim 11, wherein the content processor of the online media server is further configured to monitor the online activities of the user's friends in the social network, wherein the online activities include a communication from one of the user's friends to another one of the user's friends via the social network.

18. A computer non-transitory readable media having program instructions for providing content for webpages, the computer non-transitory readable media comprising program instructions for:
providing, by an online media server, a plurality of selections on a webpage for display on a client device to set webpage personalization settings within the web page on the client device, wherein the plurality of selections includes a Friends selection related to a social network of a user, an Off selection that is not related to the social network and not related to the user and is related to popularity of content, and a Full selection that is related to personalized content for the user, wherein the social network is maintained by a social media server;
receiving an input, by the online media server, for the Friends selection within the web page from the user, wherein the input for the Friends selection is received while the web page is being displayed on the client device via the Internet;
in response to receiving the input for the Friends selection from the plurality of selections, selecting, by the online media server, one or more content modules for displaying on the webpage, wherein the one or more content modules are configured to include advertisement content that is selected based on online activities of the user's friends in the social network; and
in response to said selecting of the one or more content modules, forwarding, by the online media server, the one or more content modules and the advertisement content to the client device for display on the webpage from which the Friends selection is made by the user, wherein the advertisement content is displayed within the one or more content modules, wherein each of the content modules displayed includes a content indicator that indicates one of the webpage personalization settings;

receiving another input for the Off selection within the webpage displayed on the client device when the Off selection is selected by the user;

in response to receiving the input for the Off selection, switching, by the online media server, the advertisement content that is displayed to another advertisement content that is selected based on the Off selection and switching the content indicator to another content indicator for display within the webpage.

19. The computer non-transitory readable media of claim 18, wherein the other advertisement content for the Off selection is not based on a browsing history of the user and not based on the online activities of the user's friends.

20. The computer non-transitory readable media of claim 18, wherein the program instructions are for monitoring the online activities of the user's friends in the social network.

* * * * *